Sept. 10, 1963 L. O. REICHELT 3,103,122
REVERSIBLE DRIVES FOR THREADED CONNECTORS
Filed July 20, 1960 2 Sheets-Sheet 2
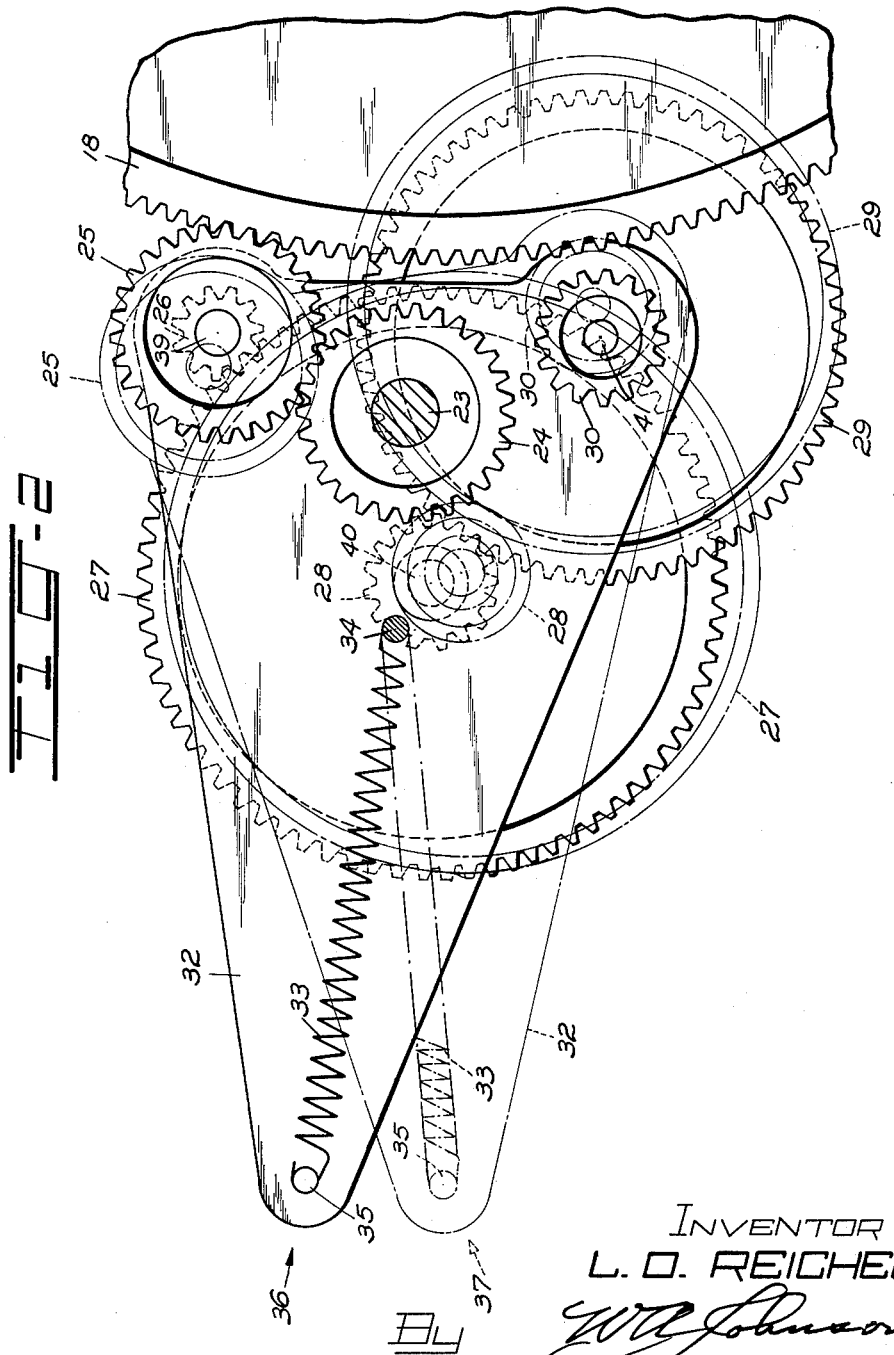
INVENTOR
L. O. REICHELT
BY
ATTORNEY

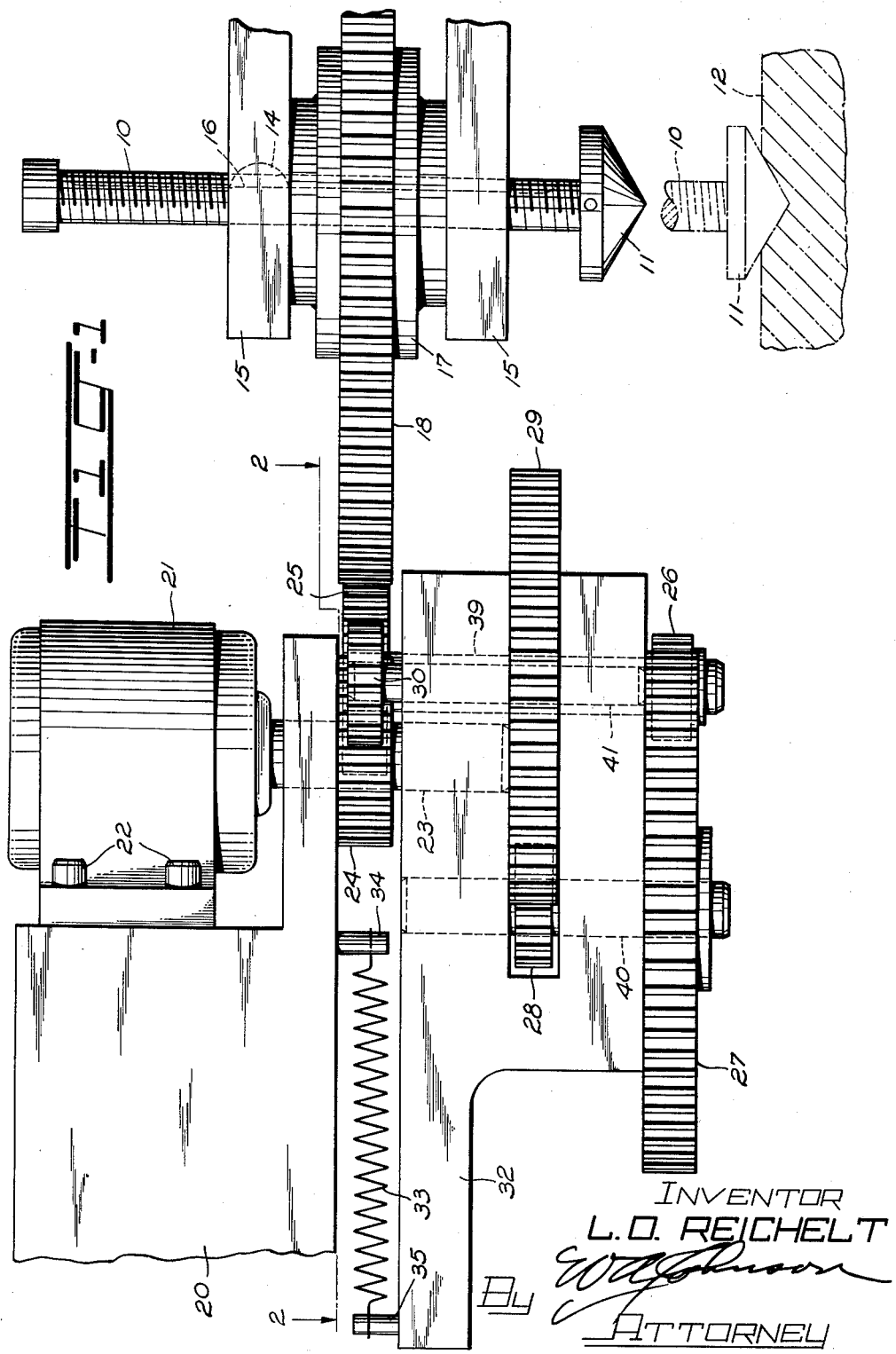

3,103,122
REVERSIBLE DRIVES FOR THREADED CONNECTORS

Lester O. Reichelt, Downers Grove, Ill., assignor to Western Electric Company, Incorporated, New York, N.Y., a corporation of New York
Filed July 20, 1960, Ser. No. 44,056
5 Claims. (Cl. 74—57)

This invention relates to reversible drives for threaded connectors particularly threaded cone center supports for core trucks in stranding cabler machines.

In the manufacture of cables for the telephone industry, the cable cores produced by stranders or stranding cablers are wound on core trucks mounted in take-up units while being rotated about the axes of the core trucks, and while the core trucks are rotated about normal center lines of the cable cores moving into the take-up units.

The core trucks are supported between upper and lower cone centers, the upper cone center, in most instances, is supported by a threaded member held for axial movement but against rotary movement and operatively connected to a rotatable internally threaded element held against axial movement to move the cone center into and out of engagement with the core truck. It has been determined that suitable power means may be employed to drive the nut-like internally threaded element to move the connector or threaded support for the cone center downwardly to cause the cone center to engage the object or core truck. However, the same power means or the same driving force required to make this engagement of the connector or threaded support for the cone center, would be insufficient to cause disengagement of the cone center from the object or core truck as this connection has, in a sense, become frozen during the driving action to take up the cable core on the core truck and this connection must be broken, requiring much greater force than that initially employed in causing engagement of the connector and object.

An object of the invention is a reversible drive, automatic in its operation, and highly efficient in forming engagement of a connector with, and disengagement of a connector from, an object.

In accordance with the object, the invention comprises a reversible drive for a threaded connector movable axially relative to an object and including a main gear mounted concentric with an internally threaded element disposed on the threaded connector, a reversible motor and a train of gears driven by the motor, and including first and second gears movable alternately into engagement with the main gear to drive the main gear in different driving directions under different forces to cause engagement of the connector with, and disengagement of the connector from, an object.

More specifically, the reversible motor is fixedly mounted and has a drive shaft spaced from, but positioned parallel with, the threaded connector. A drive gear is mounted on the motor shaft whereas the train of gears with their respective shafts is supported by an arm rockable into first and second positions about the axis of the motor shaft to respectively move the first and second gears alternately into engagement with the main gear. A spring, functioning to hold the arm in either its first or second position, cooperates with the first and second gears when rotating in their driving directions to more closely interengage the main gear, but with insufficient force to keep the first and second gears, when driven in reverse directions from their driving directions, from climbing out of their engagement with the main gear and causing rocking of the arm to move their respective opposing first or second gears into engagement with the main gear.

Other objects and advantages will be apparent from the following detailed description when considered in conjunction with the accompanying drawings wherein:

FIG. 1 is a side elevational view of the reversible drive; and

FIG. 2 is a plan view taken along the line 2—2 of FIG. 1.

In the present instance, the threaded connector 10, has a cone center 11, adapted for connection with an object 12 which is the upper end of a core truck to be mounted in a strander or stranding cabler machine. Actually, in structures of this type, the cone center 11 is rotatably supported so that it may rotate with the object 12. However, the threaded connector is held against rotation by suitable means such as a key 14 carried by one of its supports 15 and extending into a keyway 16. An internally threaded element 17 disposed between the supports 15 is held thereby against axial movement but is permitted to rotate to move, through its threaded connection with the connector 10, the connector into and out of engagement with the object 12. A main gear 18 is fixedly mounted on and concentric with the element 17.

A stationary support 20 disposed adjacent the main gear 18 has a reversible motor 21 mounted thereon at 22. A drive shaft 23 of the motor has a drive gear 24 mounted thereon and adapted to drive a train of gears 25, 26, 27, 28, 29, and 30. The train of gears is supported on its respective shafts which are disposed in suitable bearings, not shown, in an arm 32. The arm 32 is supported by suitable means, not shown, for rocking movement about the axis of the motor shaft 23. The arm 32 is of the contour shown and is under the control of a spring 33 having one end fixed to a pin 34 mounted on the support 20 and the other end fixed to a pin 35 mounted adjacent the outer end of the arm. In FIG. 2, the arm is shown in solid lines in a first position 36 and in broken lines in a second position 37. A position, identified as a dead center position for the arm midway between the first and second positions 36 and 37, would place the pins 34 and 35 and the axis of the motor shaft 23 in a given plane.

In following the train of gears, it will be observed that gears 25 and 26 are mounted respectively on upper and lower ends of a shaft 39, that gears 27 and 28 are mounted respectively on lower and intermediate portions of a shaft 40, and that gears 29 and 30 are mounted respectively on intermediate and upper portions of a shaft 41.

Attention is now directed to the sizes of the gears and that the gears 25 and 30, respectively, may be known as first and last gears as they are the gears in the train which will engage the main gear 18 alternately to drive the connector 10 into and out of engagment with the object 12. In comparing the sizes of the gears, it will be noted that the gears 24 and 25, namely the drive gear 24 and the first gear 25, are identical, but the comparison of the first gear 25 with the main gear 18 provides a ratio of 16.7 to 1 in driving the connector into engagement with the object.

In the train of gears from the drive gear 24 to the main gear 18, through gears 25 to 30, the ratio is 1260 to 1, providing a much greater force for the driving means to break the connection between the connector and the object and move the connector free of the object.

Operation

The reversible drive is completely automatic in its operation. The circuits for the reversible motor 21 are not shown as it should be understood that the closing of one circuit would cause the motor to drive in first direction, whereas the opening of that circuit and the closing of another circuit would cause the motor to drive in a reverse or second direction. With the structure in the position shown in FIG. 1, the connector 10 spaced from the object 12 and the arm 32 in the first position 36, closing of the circuit to drive the motor in a preferred direction, will cause the drive gear 24 to drive the first gear 25, to drive the main gear 18 and thereby rotate the element 17 to move the connector downwardly into connection with the object 12. During this action, the rotation of the first gear 25 in its driving direction will be assisted by the spring 33 tending to form stronger interengagement of the first gear with the main gear. This is due to the position of the first gear with respect to the axis of the arm about the axis of the motor shaft.

When it is desired to break the connection of the connector 10 with the object 12, all that is necessary for the operator to do is to operate the switch which will open the first driving circuit and close its reverse driving circuit for the motor. This action will reverse the direction of the drive gear 24 and the train of gears. As a result, the first gear 25 will climb out of its engagement with the main gear 18 and, in doing so, move the arm 32 against the force of the spring 33 beyond the dead center position from the first position 36 to the second position 37. The resulting action is disengagement of the first gear 25 from the main gear 18 and, when the arm moves beyond dead center position where it will be urged into the second position 37, cause engagement of the last gear 30 with the main gear 18.

In this instance, the entire train of gears interposed between the drive gear 24 and the main gear 18 functions to establish sufficient torque through the aforementioned gear ratio to break the connection instantly between the threaded connector 10 and the object 12 and move the connector into its normal position free of the object.

Previously, when the second gear 30 was being rotated in its driving direction and assisted by the force of the spring 33, its natural action was to tend to form a more positive interconnection with the main gear 18 due to the position of the last gear 30, with respect to the axis of the arm. However, when the second gear 30 is rotated in a reverse direction, its action is to climb out of connection with the main gear and, in doing so, force the arm about its axis against the force of the spring 33 to move the arm beyond its dead center position into the first position to cause engagement of the first gear 25 with the main gear 18.

The connecting means or the reversible drive for the threaded connector provides a rapid drive of the connector into engagement with the object. Although the drive for disconnecting the connector from the object is much slower, the important purpose of providing sufficient torque through the total ratio accomplished by the train of gears, will result in instant breaking of the connection between the connector and the object and the movement of the connector free of the object.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A reversible drive for an externally threaded connector movable into and out of connection with an object comprising:

an internally threaded element disposed concentric with the connector and threadedly connected thereto, means to support the connector for axial movement only and to support the element for rotary movement only, a main gear movable in first and second directions disposed concentric with the element and fixed thereto, a reversible motor mounted at a fixed position spaced from the connector and having a shaft driven in first and second directions, a drive gear mounted on the motor shaft, an arm disposed adjacent the main gear and supported for rocking movement about the axis of the motor shaft into and out of first and second positions, a first gear smaller than the main gear to provide a predetermined gear ratio between the drive gear and main gear, rotatably supported by the arm, driven by the drive gear and positioned to engage and drive the main gear in its first direction when the arm is in the first position during driving of the motor in the first direction to cause the element to move the connector into connection with the object, and a train of interconnected gears rotatably supported by the arm and including the first gear engaging and driven by the drive gear and a last gear of the train of gears providing a much greater gear ratio between the drive gear and main gear through the train of gears than through the first gear above to drive the main gear in its second direction through the train of gears when the arm is in the second position during driving of the motor in the second direction for driving the main gear in the second direction with sufficiently increased torque to break the connection instantly between the connector and the object.

2. The reversible drive according to claim 1 in which: force applying means is operatively connected to the arm and actuable to hold the arm selectively in said first and second positions to respectively hold the first gear and the last gear of the train of gears in engagement with the main gear.

3. The reversible drive according to claim 1 in which:

a spring under a predetermined tension has one end thereof fixed to a first pin on the arm at a position spaced from the axis of the arm at the motor shaft, and a stationary second pin for connection with the other end of the spring located at dead center between the first pin and the axis of the arm when both the first gear and the last gear of the train of gears are out of engagement with the main gear and located at opposite sides of dead center when the first gear and the last gear of the train of gears are respectively disposed in engagement with the main gear where they will be held in place by the spring.

4. The reversible drive according to claim 1 in which:

a spring under a predetermined tension has one end thereof fixed to a first pin on the arm at a position spaced from the axis of the arm at the motor shaft, a stationary second pin for connection with the other end of the spring located at dead center between the first pin and the axis of the arm when both the first gear and the last gear of the train of gears are out of engagement with the main gear and located at opposite sides of dead center when the first gear and the last gear of the train of gears are respectively disposed in engagement with the main gear where they will be held in place by the spring, and a shaft for the first gear supported by the arm at a position relative to the drive gear so that when the motor is driven in the first direction the first gear will tend to move into closer engagement with the main gear and when the motor is driven in the second direction the first gear will climb out of engagement with the main gear and thereby force the arm beyond the dead center position to automatically cause disengagement of the first gear with the main gear and engagement of the last gear of the train of gears with the main gear.

5. A reversible drive according to claim 1 in which:

a spring under a predetermined tension has one end thereof fixed to a first pin on the arm at a position spaced from the axis of the arm at the motor shaft, a stationary second pin for connection with the other end of the spring located at dead center between the first pin and the axis of the arm when both the first gear and the last gear of the train of gears are out of engagement with the main gear and located at opposite sides of dead center when the first gear and the last gear of the train of gears are respectively disposed in engagement with the main gear where they will be held in place by the spring, and a shaft for the last gear of the train of gears supported by the arm at a position relative to the drive gear so that when the motor is driven in the second direction said last gear will tend to move into closer engagement with the main gear and when the motor is driven in the first direction said last gear will climb out of engagement with the main gear and thereby force the arm beyond the dead center position to automatically cause disengagement of said last gear from the main shaft and engagement of the first gear with the main shaft.

References Cited in the file of this patent

UNITED STATES PATENTS

| | | |
|---|---|---|
| 638,194 | Arnold | Nov. 28, 1899 |
| 983,602 | Coine | Feb. 7, 1911 |
| 1,571,610 | Tingley | Feb. 2, 1926 |
| 1,736,064 | Walker | Nov. 19, 1929 |
| 2,175,086 | Mitchell | Oct. 3, 1939 |
| 2,896,873 | Mageoch | July 28, 1959 |
| 2,907,224 | Cafolla | Oct. 6, 1959 |
| 2,938,402 | Willmore | May 31, 1960 |
| 2,979,966 | Martens | Apr. 18, 1961 |

FOREIGN PATENTS

| | | |
|---|---|---|
| 1,036,595 | Germany | Aug. 14, 1958 |